United States Patent [19]

Whiteside, II et al.

[11] Patent Number: 4,946,655
[45] Date of Patent: Aug. 7, 1990

[54] SEAL SYSTEM FOR A PROCESS VESSEL

[75] Inventors: James D. Whiteside, II; David F. Bichler, both of Borger, Tex.

[73] Assignee: Phillips Petroleum Company, Bartlesville, Okla.

[21] Appl. No.: 250,797

[22] Filed: Sep. 28, 1988

[51] Int. Cl.⁵ .......................... E04B 1/68; F16J 15/00; F26B 15/02
[52] U.S. Cl. ..................................... 422/143; 29/462; 29/469; 52/573; 277/1; 277/26; 277/DIG. 6; 422/311
[58] Field of Search ...................... 277/1, 26, DIG. 6; 52/573; 422/143, 144, 221, 222, 311; 29/469, 462

[56] References Cited

U.S. PATENT DOCUMENTS

| | | | |
|---|---|---|---|
| 2,595,384 | 5/1952 | Johnsen et al. | 422/311 |
| 2,690,962 | 10/1954 | Clarke | 422/143 |
| 3,462,246 | 8/1969 | Copeland | 422/143 |
| 3,553,847 | 1/1971 | Kramer et al. | 422/143 X |
| 4,493,816 | 1/1985 | Becker et al. | 422/143 |
| 4,581,882 | 4/1986 | Pallo et al. | 277/DIG. 6 |

*Primary Examiner*—Allan N. Shoap
*Attorney, Agent, or Firm*—George E. Bogatie

[57] ABSTRACT

A seal system for a circular perforated grid floor in a walled process vessel is disclosed, wherein air is passed upwardly through the perforations in the grid floor into catalyst bed, and by-passing of air through a gap between the grid floor and the wall of the process vessel is prevented by the seal. The seal system relies on the grid floor expanding into an annular space which is partially filled with a compressible packing material. When heated, the grid floor compresses the packing material to form the desired air tight seal between the grid floor and the vessel wall.

9 Claims, 3 Drawing Sheets

SEAL SYSTEM FOR A PROCESS VESSEL

This invention relates to improvements in a petroleum processing vessel. In one aspect it relates to apparatus which forms a seal between a floor and a wall within the process vessel. In another aspect it relates to a method for preventing by-passing of gases in a gap between the floor and the wall in the process vessel.

BACKGROUND OF THE INVENTION

This invention is particularly applicable to fluidic catalytic cracking units (FCCU) of the type having a perforated distributor grid floor which is hereinafter referred to as a grid floor. The grid floor supports a fluidized catalyst bed in a catalyst regenerator vessel. It is necessary, in the catalyst regeneration process, to distribute air evenly throughout the fluidized catalyst bed in the regenerator vessel. This is accomplished by uniformly passing air upwardly through the grid floor of the regenerator vessel such that the air is evenly distributed throughout the fluidized catalyst bed. The grid floor must be sealed relative to the vessel wall, otherwise air passing in a gap between the floor and the vessel wall can create hot spots in the fluidized catalyst being regenerated and can ultimately result in a shut-down of the FCCU.

The interior of an FCCU regenerator containing the fluidized catalyst operates at a high temperature which causes the grid floor to expand and contract several inches between start-up and shut-down, while there is relatively little or no change in the diameter of the insulated regenerator wall. Also there are other effects which encourage by-passing of air and other regenerator gases around the edge of the grid floor, such as tendencies toward deformation of the grid floor and the vessel wall due to differential expansion, and the erosive effects of the fluidized catalyst which moves within the vessel.

Accordingly, it is an object of this invention to provide a method to prevent passing of gases around the grid floor of a catalyst regeneration vessel.

It is a further object of this invention to provide apparatus for providing a seal between the grid floor and the vessel wall in a catalyst regeneration vessel.

SUMMARY OF THE INVENTION

According to the present invention a seal system is provided for a generally cylindrical process vessel. The seal system prevents by-passing of air between the cylindrical wall of a vertically oriented vessel and a circular grid floor which is positioned in the lower portion of the vessel.

Support members for the grid floor are provided which allow for slideable horizontal movement of the grid floor relative to the vessel wall. The slideable movement of the grid floor is necessary since the seal system relies on expansion of the grid floor with respect to the vessel wall to form an effective seal.

The seal system further includes a pair of radially inwardly extending seal plates carried by the vessel wall and defining a continuous annular space of generally rectangular cross section extending around the interior of the vessel wall. The annular space is open at its inner circumference for closely receiving the circumferential edge of the grid floor such that the edge of the grid floor preferably occupies ¼ or less of the total volume of the annular space when the vessel is unheated.

A quantity of compressible packing material is also positioned in the annular space intermediate the circumferential edge of the grid floor and the wall of the vessel such that the compressible packing material preferably occupies about ½ of the total volume of the annular space when the vessel is unheated. At elevated temperatures the grid floor expands horizontally into the annular space to contact and compress the packing material, thereby forming an air tight seal between the grid floor and the wall of the vessel.

Other objects and advantages of the invention will be apparent from the foregoing brief description of the invention and the claims as well as the description of the drawings which are briefly described as follows:

DESCRIPTION OF THE PREFERRED EMBODIMENT

Figure 1:
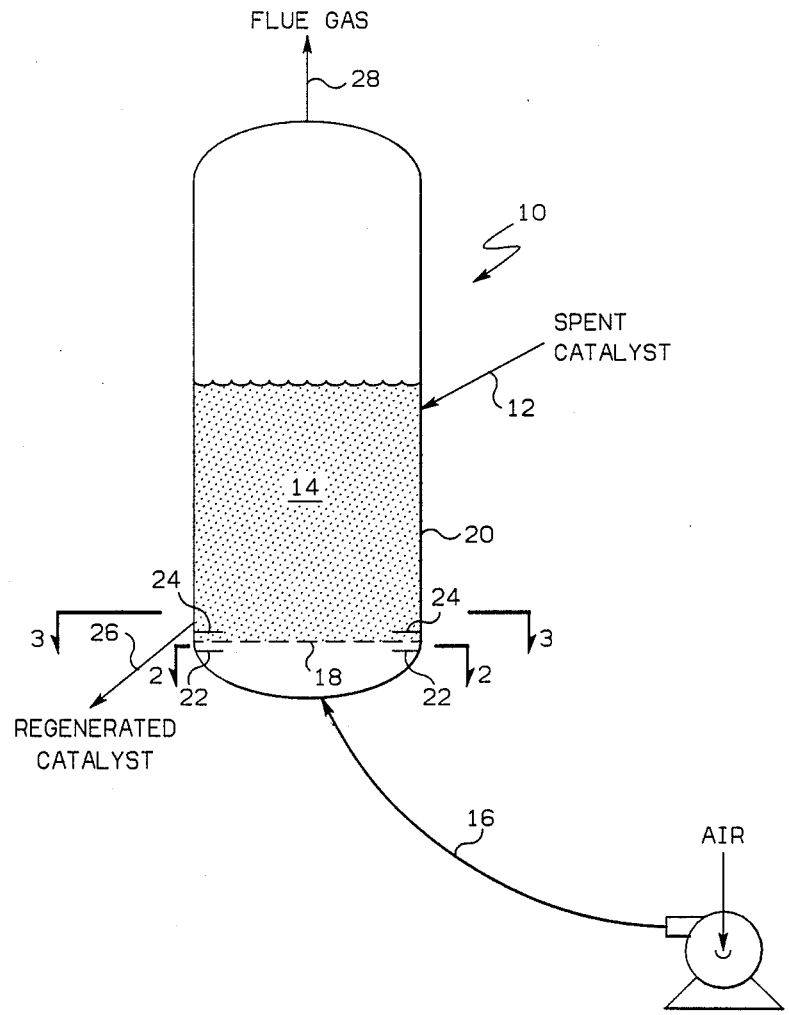
FIG. 1 is a diagrammatic view of the interior of a catalytic cracking regenerator vessel illustrating the position of the improved grid floor seal system.

In the following discussion parts which appear in more than one of the drawing Figures shall be referred to as the same reference numeral. The invention is illustrated and described in terms of a catalyst regeneration vessel associated with a catalytic cracking process. However, the problem of sealing a grid floor is generally applicable to vessels which contain fluidized beds. Therefore, the invention is applicable to any particular process where by-passing of gases in a gap between a grid floor and a vessel wall is undesirable.

Referring now to FIG. 1, a catalyst regeneration vessel is illustrated generally at 10. The vessel 10 receives spent catalyst containing coke from an FCCU reactor (not illustrated) via line 12. In the regenerator a catalyst bed 14 is formed and coke is burned from the catalyst with air supplied via line 16. The air is evenly distributed throughout the catalyst bed 14 by passing upwardly through perforations in the grid floor 18. The air supplied through line 16 fluidizes the catalyst bed 14.

The perforated grid floor 18 is sealed against the generally cylindrical wall 20 of regenerator vessel 10 by a lower seal plate 22 and an upper seal plate 24 as will be more fully explained hereinafter.

The heat of combustion of the coke raises the catalyst temperature to 1,100° to 1,250° F. The regeneration catalyst is then passed through line 26 for recirculation to the FCCU reactor, and the flue gas passes through line 28 to heat recovery apparatus (not illustrated).

Figure 2:
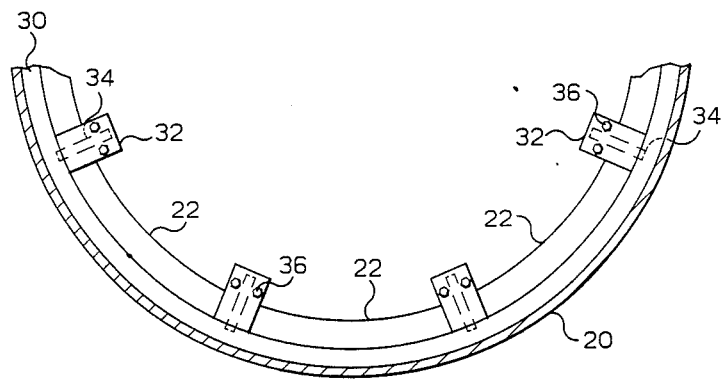
FIG. 2 is a partial cross-sectional view taken along lines 2—2 of FIG. 1, showing a portion of the lower seal plate and several perimeter support plates for regenerator grid floor illustrated in FIG. 1.
Figure 3:
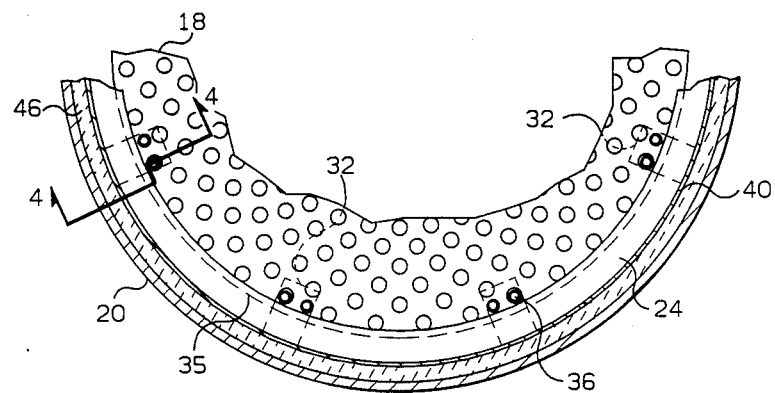
FIG. 3 is a partial cross-sectional view taken along lines 3—3 of FIG. 1 showing the upper seal plate and its relation to the grid floor.
Figure 4:
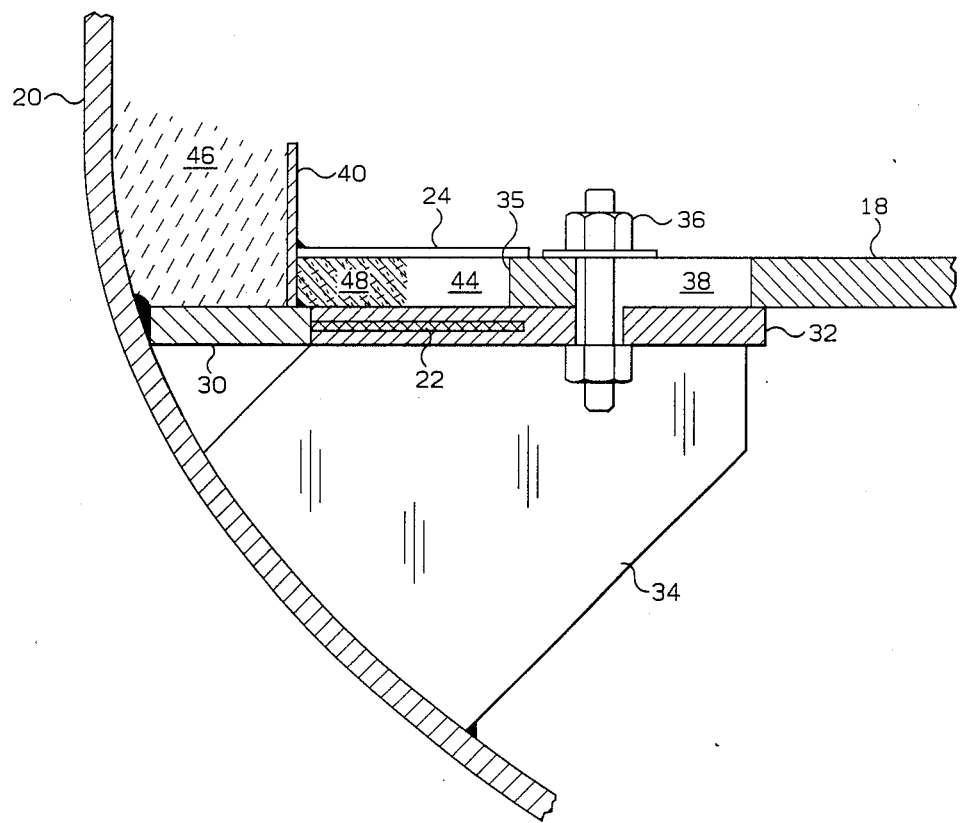
FIG. 4 is a partial cross-sectional view taken along lines 4—4 of FIG. 3, showing the slideable mounting of the grid floor illustrated in FIG. 3.

The portion of the interior of the regeneration vessel 10 to which the present invention is applicable is shown in greater detail in FIGS. 2, 3 and 4.

In a preferred embodiment of the invention, as best seen in FIGS. 2, 3 and 4, a portion of the support means and seal means at the perimeter of the grid floor 18 are illustrated. The support means includes a flat grid support ring 30 welded along the outer circumferential edge thereof to the interior surface of vessel wall 20. A plurality of spaced apart plates 32, for contacting and supporting the grid floor 18 at its perimeter, are carried by the interior of the vessel and are preferably welded to the grid support ring 30 so as to extend inwardly toward the center of vessel 10. Plates 32, which are preferably the same thickness as support ring 30, are also preferably supported by gusset members 34. Additional support rods (not shown) for grid floor 18 may be attached near the center of grid floor 18 and to the wall 20 at points below the gusset member 34, if desired.

Also illustrated in FIG. 2 is a thin flat lower seal plate 22 which is formed, by suitable means such as welding a plurality of acurate pieces of metal between the plates 32 and to the grid support ring 30. The flate upper surface of the seal plate 22, which is positioned parallel to the upper surface of the plate 32, extends inwardly to about ½ of the inward extension of plate 32.

With the regenerator vessel 10 unheated, the grid floor 18 rests on the upper surface of the plates 32 and the circumferential edge 35 of the grid floor extends over the plates 32 to a point where the edge 35 of the grid floor 18 slightly overlaps the lower grid seal plates 22 and 24.

Referring now more specifically to FIG. 4, the sealing system between the grid floor 18 and the vessel wall 20 is more clearly illustrated.

Grid floor 18 is slidably secured to each plate 32 preferably by a pair of threaded studs 36 and associated nuts. As illustrated in FIG. 4 each stud 36 passes through an expansion slot 38 in the grid floor 18 to allow horizontal expansion of the grid floor 18 by sliding over plate 32.

A vertically disposed annular wear plate 40 is fixedly secured by suitable means such as welding to the top surface of the grid support ring 30 near the inner edge of grid support ring. Welded to the wear plate 40 is the annular upper seal plate 24. Seal plate 24, which is a continuous metal ring of similar material as seal plate 22, is also positioned parallel to the upper surface of the plate 32 to form, in conjunction with the wear plate 40, the lower seal plate 22, and the upper surfaces of the plates 32, a continuous annular space 44 around the inner circumference of vessel 10. In an unheated vessel, seal plate 22 extends inwardly to slightly overlap the outer edge 35 of grid floor 18. Between the vessel wall 20 and the wear plate 40 there is illustrated a layer of refractory insulating material 46, which would typically cover the interiors of the high temperature portion of vessel 10.

A strip of compressible packing or fiber material 48 is packed between the seal plates 22 and 24 in the annular space 44. The uncompressed fiber material 48 extends inwardly from the wear plate 40 to about ½ of the inward extension of seal plates 22 and 24 so that normal expansion of the grid floor 18 will compress the material 48. A suitable material for the compressible fiber material 48, which has the capacity to withstand the vessel operating temperature conditions, is a compressible ceramic fiber material known as fiber blanket available from Carborundum Co., Niagara Falls, N.Y.

When the regenerator vessel 10 is unheated, the circumferential outer edge 35 of the grid floor 18 preferably occupies less than about ¼ of the volume of the annular space 44.

When the regenerator vessel 10 is started up, the grid floor 18 expands and distorts a considerable amount as the regenerator vessel 10 reaches operating temperature. This causes horizontal expansion of the grid floor 18. Expansion slots 38 in the grid floor 18 are provided to allow horizontal expansion of the grid floor 18 such that the circumferential outer edge 35 of the grid floor 18 moves horizontally to contact the fiber material 40. Further expansion of the grid floor 18 compresses the fiber material 48 to form an air tight seal by sufficiently compressing the fiber material 48 in the annular space 44 to form an air tight seal when the regenerator vessel 10 reaches operating temperature.

Prior to packing the fiber material 48 in the annular space 44 extending about the interior of the regenerator vessel wall, difficulty was encountered in the operation of the FCCU because air leaks between the seal plate and the grid floor resulted in afterburning of the regenerator.

Installation of the fiber material in the annular space provided in the FCCU effectively prevented by-passing of air between the grid floor and the regenerator vessel wall and substantially eliminated afterburning in the regenerator.

While the invention has been described in terms of a presently preferred embodiment, reasonable variations and modifications are possible by those skilled in the art. Such variations and modifications are within the scope of the present invention as claimed.

That which is claimed is:

1. Apparatus comprising:
    a vessel having a generally cylindrical wall wherein said vessel is generally vertically oriented;
    a circular grid floor having a circumferential outer edge, said grid floor being disposed generally horizontally within said vessel, said grid floor being perforated for the passage of air therethrough;
    means for supporting said grid floor in a horizontal plane in a lower portion of said vessel, wherein said means for supporting said grid floor allows horizontal expansion of said grid floor relative to said vessel;
    means for forming a continuous annular space around the interior of said wall of said vessel for closely receiving said outer edge of said circular grid floor, and wherein said outer edge of said grid floor occupies less than ¼ of the volume of said annular space when said vessel is unheated; and
    a quantity of compressible packing material positioned in said annular space adjacent to said cylindrical wall and spaced apart from said outer edge of said grid floor so as to form an empty space therebetween when said vessel is unheated, and wherein said compressible packing material occupies essentially ½ of the volume of said annular space.

2. Apparatus in accordance with claim 1 wherein said compressible packing material is a ceramic fiber material.

3. Apparatus in accordance with claim 1 wherein a plurality of expansion slots are provided in said grid floor and wherein said means for supporting said grid floor comprises:
    a plurality of spaced apart support plates corresponding to said plurality of expansion slots, and wherein the upper surfaces of said plurality of support plates are positioned generally horizontally and carried by the wall of said vessel; and
    means for slidably securing said grid floor to said support plates through said expansion slots in said grid floor.

4. Apparatus in accordance with claim 3 wherein said means for forming an annular space about the interior of said vessel comprises:

an upper annular seal plate fixedly secured to the wall of said vessel wherein said upper annular seal plate is formed of thin flat metal with the lower surface thereof lying in a generally horizontal plane above the upper surfaces of said support plates; and a lower annular seal plate fixedly secured to the wall of said vessel wherein said lower annular seal plate is formed of thin flat metal with the upper surface thereof lying in a generally horizontal plane no higher than the upper surfaces of said support plates, whereby said annular space is formed between said upper and lower seal plates.

5. A method for preventing by-passing of gases in a gap between a circular grid floor having a circumferential outer edge and a generally cylindrical wall of a vertically oriented vessel, said method comprising the steps of:

supporting said circular grid floor for horizontal movement relative to said wall of said vessel;

forming a continuous annular space extending around the interior of said wall of said vessel for closely receiving said circumferential outer edge of said circular grid floor;

placing a compressible packing material within said continuous annular space adjacent to said generally cylindrical wall and spaced apart from said circumferential outer edge of said grid floor so as to form an empty space therebetween when said vessel is unheated; and establishing a seal between said wall of said vessel and said outer edge of said grid floor by allowing said outer edge of said circular grid floor to expand into said annular space when said vessel is heated so as to compress said compressible packing material.

6. A method in accordance with claim 5 wherein said packing material is a ceramic fiber material.

7. A method in accordance with claim 5 wherein a plurality of expansion slots are provided in said grid floor and wherein said step for supporting said circular grid floor comprises:

providing a plurality of spaced apart support plates, having upper surfaces, around the interior wall of said vessel; and slidably securing said circular grid floor to said support plates through said expansion slots in said grid floor.

8. A method in accordance with claim 5 wherein said vertically oriented vessel is a catalyst regeneration vessel associated with a fluidic catalytic cracking process.

9. A method for preventing by-passing of gases in a gap between a circular grid floor, having a circumferential outer edge, and the generally cylindrical wall of a vertically oriented vessel, said method comprising the steps of:

fixedly securing a plurality of spaced apart support plates, having upper surfaces, around the interior of a lower portion of the cylindrical wall of said vessel, for horizontally supporting said circular grid floor;

fixedly securing a continous thin flat upper seal plate, having a lower surface, around the interior of the cylindrical wall of said vessel;

fixedly securing a thin flat lower seal plate, having an upper surface, around the interior of the cylindrical wall of said vessel, said lower seal plate being no higher than the upper surface of said plurality of support plates, wherein said upper surface and said lower surface form a continuous annular space extending around the interior of the wall of said vessel for closely receiving said circumferential outer edge of said circular grid floor;

placing a compressible packing material within said continuous annular space wherein said compressible packing material occupies essentially ½ of the volume of said annular space;

providing a number of expansion slots in said circular grid floor equal to the number of said plurality of support plates; and supporting said circular grid floor for horizontal movement relative to the wall of said vessel by securing said grid floor to said support plates through said expansion slots in said grid floor, wherein said circumferential outer edge of said circular grid floor occupies less than ¼ of the volume of said annular space when said vessel is unheated.

* * * * *